United States Patent [19]

Hill

[11] Patent Number: 5,456,323
[45] Date of Patent: Oct. 10, 1995

[54] AGRICULTURAL SWEEP AND METHOD OF MANUFACTURE

[75] Inventor: Earl E. Hill, Rossville, Tenn.

[73] Assignee: Piper Farm Products, Inc., Collierville, Tenn.

[21] Appl. No.: 168,071

[22] Filed: Dec. 15, 1993

[51] Int. Cl.⁶ .................................................. A01B 39/20
[52] U.S. Cl. ......................... 172/721; 427/436; 172/725; 172/730
[58] Field of Search .................... 427/256, 284, 427/226, 287, 436; 172/725, 721, 726, 772, 772.5, 730; 111/124, 152

[56] References Cited

U.S. PATENT DOCUMENTS

| | | |
|---|---|---|
| Re. 27,851 | 12/1973 | Alessi . |
| 645,520 | 3/1900 | Braddock ................................. 427/436 |
| 1,979,486 | 11/1934 | Myers ..................................... 427/436 |
| 2,624,684 | 12/1951 | Heiman ................................... 427/436 |
| 2,650,886 | 1/1951 | Zeley ..................................... 427/436 |
| 2,712,174 | 7/1955 | Hubbell ................................. 427/256 |
| 3,171,500 | 3/1965 | Dils ........................................ 172/722 |
| 4,408,667 | 10/1983 | Jarvis ..................................... 172/730 |
| 4,415,042 | 11/1983 | Cosson ................................... 172/725 |
| 4,457,381 | 7/1984 | Wetmore ............................... 172/722 |
| 4,459,328 | 7/1984 | Mizuhara ............................... 427/350 |
| 4,580,639 | 4/1986 | Johnson . |
| 4,787,462 | 11/1988 | Nichols . |
| 4,867,248 | 9/1989 | Robertson et al. ..................... 172/721 |
| 5,111,600 | 5/1992 | Lukavich et al. ...................... 37/141 |

Primary Examiner—Randolph A. Reese
Assistant Examiner—Spencer Warnick
Attorney, Agent, or Firm—Walker, McKenzie & Walker

[57] ABSTRACT

An agricultural sweep for being attached to a tractor for pulling the agricultural sweep across the ground. The agricultural sweep incudes a ground engaging portion having a cutting edge for cutting through the ground as the sweep is pulled across the ground; a stem portion for attaching the ground engaging portion to a tractor; and an extended wear portion applied to the stem portion for rendering the stem portion resistant to abrasion.

2 Claims, 1 Drawing Sheet

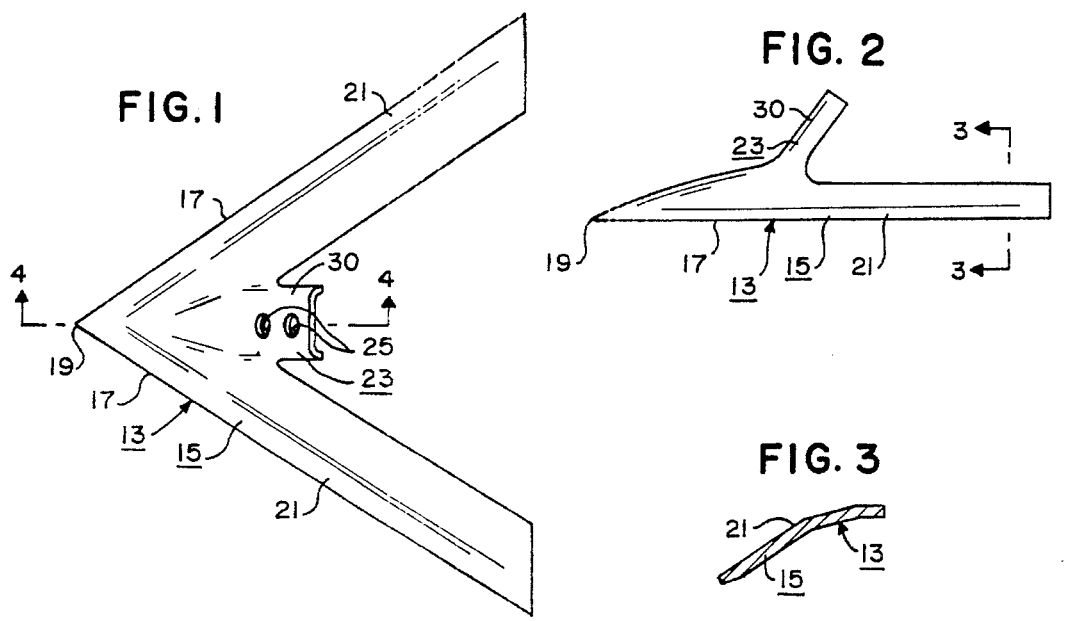
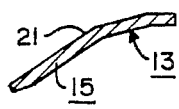
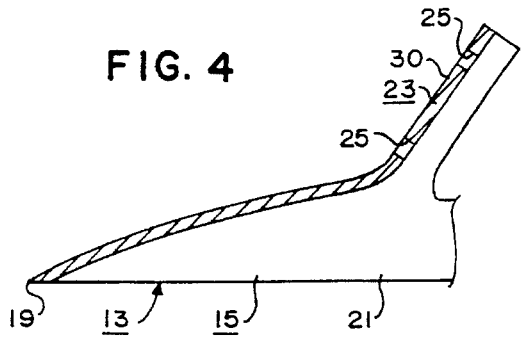
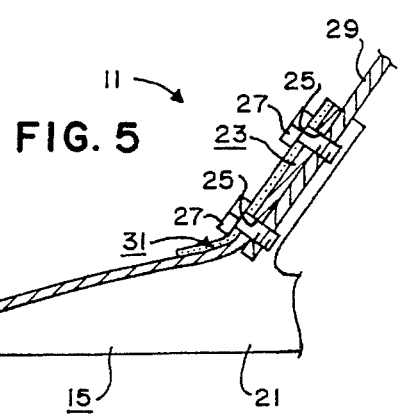
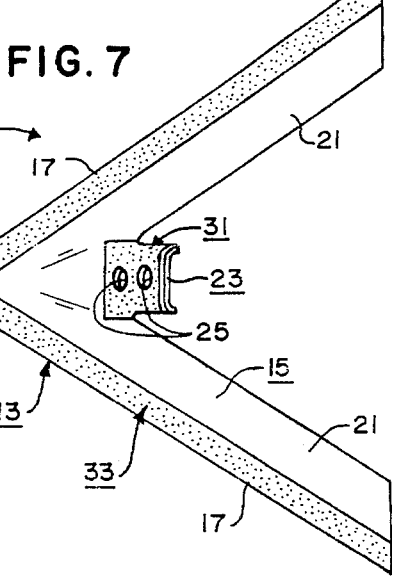

AGRICULTURAL SWEEP AND METHOD OF MANUFACTURE

BACKGROUND OF THE INVENTION

1. Field of the Invention

The present invention relates, in general, to agricultural sweeps and, more specifically, to an improved agricultural sweep and an improved method of manufacturing an agricultural sweep.

2. Information Disclosure Statement

Agricultural sweeps are generally pulled by agricultural tractors or the like. Such sweeps are generally used to till the ground by cutting off or uprooting undesirable plants, breaking up the soil, etc. A typical agricultural sweep includes an earth or ground engaging body portion and a stem portion extending upward from the body portion for being attached to a tractor or the like. The ground engaging portion typically has a forward nose or point and one or two swept back wing portions extending back from the forward nose. A cutting edge generally extends from the leading edge of the nose along the leading edge of each wing portion.

Since such tillage tools are commonly pulled through the soil by tractors at relative high forward velocities, they are subjected to substantial wear and tear. Adams Hardfacing of Guyman, Okla. is believed to have pioneered the use of hard-facing the cutting edge of tillage tools in the 1920's as a means of keeping the cutting edge sharp, which, in turn, makes it easier for the tools to be pulled through the ground. Hardfacing is the process of welding an abrasion and wear resistant metal onto parts or surfaces subjected to rapid wear. As agricultural tractors became more powerful, hard-facing also became a means of enhancing the expected useful life of tillage tools.

Another well-know process of hard surfacing the cutting edge of tillage tools includes applying heat with an oxygen acetylene torch to the cutting edge and then fusing a hard face rod to the base metal. This very high and uneven heat that is applied to the base metal in this process is conductive to causing microscopic heat fractures to develop in the base metal. It is believed that Sam Alessi invented a process, now commonly know as the "Dura-Face" process, in the mid-60's while an employee of the Ingersoll Products Division of Borg Warner Corp., in which a metal alloy compound is applied to a part before heating, not simultaneously as in the hard-facing process. After the metal alloy compound is applied, the entire part is heated to a temperature in excess of 2,100° Fahrenheit. At that point, the metal alloy compound is impregnated into the base metal. The critical high-heating process is conducted in an atmospherically controlled environment to avoid decarbonization of the base metal, which could prevent the metal alloy compound from being impregnated into the base metal. The basic "Dura-Face" process and composition is disclosed in Alessi, U.S. Pat. Re. 27,851, reissued Dec. 25, 1973.

Another concept for increasing the useful life of the cutting edge of agricultural sweeps is based on designing the sweep to permit uniform wear across the face of the sweep without narrowing the overall width of the sweep or blunting its point as taught by Nichols, U.S. Pat. No. 4,787,462, issued Nov. 29, 1988. Nichols discloses an earth cultivating sweep including an elongated body 12 terminating in a front nose portion 14. A stem 16 is provided for attaching the body 12 to the implement. A pair of laterally extending wing members 20, 22 diverge rearwardly from the body 12. Each wing member 20, 22 defines a continuous front cutting surface 32, 34 along its forward edge between the nose 14 and the distal tip portions thereof. Each cutting surface 32, 34 is shaped in a concave curve between the nose 14 and distal tip portions. Each wing member 20, 22 further defines a continuously concave bottom surface 46, 48 which extends between the front cutting surface 32, 34 and the rear edge of each wing member 20, 22.

While the above processes and designs have been effective in maintaining the sharpness and life of the cutting edge of tillage tools, as tractors became more powerful, more stress was applied to the tillage tools, resulting in failure of the tillage tools at areas other that the cutting edge. With agricultural sweeps, failure often occurs at the stem or shaft joining the ground engaging portion to the tractor, etc. Johnson, U.S. Pat. No. 4,580,639, issued Apr. 8, 1986, discloses an agricultural sweep having an elongated protrusion on the upper surface of the ground engaging portion extending from the forward point or nose thereof to the base of the stem or shaft thereof for deflecting soil around the shaft or stem and for reducing any soil build-up in front of the shaft or stem, thereby reducing the drag created by the sweep, etc. The Johnson sweep includes a shaft 8 for being attached to the tine of the agricultural machine, and an earth engaging portion 9 which comprises an inclined point 10, steeply inclined side faces 11, and an elongated protrusion 14 extending from the point 10 toward the base of the shaft 8. The protrusion 14 is formed by indentation of the undersurface of the earth engaging portion 9 and is intended to provide a flow of soil over the sweep without any build up in front of the shaft 8.

Nothing in the known prior art discloses or suggests the present invention. More specifically, nothing in the known prior art discloses or suggests an agricultural sweep for being attached to a tractor that pulls the agricultural sweep across the ground, the agricultural sweep including a ground engaging portion having a cutting edge for cutting through the ground as the sweep is pulled across the ground; a stem portion for attaching the ground engaging portion to a tractor; and an extended wear portion applied to the stem portion for rendering the stem portion resistant to abrasion.

SUMMARY OF THE INVENTION

The present invention provides an improved agricultural sweep. A basic concept of the present invention is to provide extended wear coating on the stem of an agricultural sweep to enhance the useful life of the sweep.

The agricultural sweep of the present invention comprises, in general, a main body portion having a cutting edge for being pulled through the ground, a stem attached to the main body portion for attaching the main body portion to an agricultural machine such as a tractor, and an extended wear coating applied to the stem.

A basic object of the present invention is to provide an agricultural sweep having a stem that will resist wear caused by dirt being moved against the front of the stem as the sweep is pulled through the ground.

BRIEF DESCRIPTION OF THE DRAWINGS

FIG. 1 is a top plan view of a main body portion of the improved agricultural sweep of the present invention.

FIG. 2 is a side elevation view of the main body portion of the improved agricultural sweep of the present invention.

FIG. 3 is a sectional view substantially as taken on line 3—3 of FIG. 2 on an enlarged scale.

FIG. 4 is a sectional view substantially as taken on line 4—4 of FIG. 1 on an enlarged scale.

FIG. 5 is a sectional view substantially similar to FIG. 4 but showing an extended wear coating applied to the main body portion of the improved agricultural sweep of the present invention.

FIG. 6 is a sectional view substantially similar to FIG. 3 but showing an extended wear coating applied to the main body portion of the improved agricultural sweep of the present invention.

FIG. 7 is a top plan view substantially similar to FIG. 1 but showing an extended wear coating applied to the main body portion of the improved agricultural sweep of the present invention.

DESCRIPTION OF THE PREFERRED EMBODIMENT

A preferred embodiment of the improved agricultural sweep of the present invention is shown in FIGS. 1–7, and identified by the numeral 11. The sweep 11 is designed to be pulled by an agricultural machine such as a tractor or the like to till or otherwise work a field or the like.

The sweep 11 includes a main body portion 13 for being attached to a tool bar of the like of an agricultural machine such as a tractor as will now be apparent to those skilled in the art. The main body portion 13 may be of any substantially typical construction and design as will now be apparent to those skilled in the art.

The main body portion 13 includes an earth or ground engaging portion or means 15 having a cutting edge 17 for cutting through the ground as the sweep 11 is pulled across a field or the like. The ground engaging portion 15 may consist of a conventional triangular shaped body having a forward point 19 and a pair of wing or arm members 21, 23 extending rearwardly and outwardly from the forward point 19 with the cutting edge 17 extending from the forward point 19 along the outer front edges of each arm member 21 as clearly shown in FIGS. 1 and 7.

The main body portion 13 includes a stem portion or means 23 for attachment to a agricultural machine. For example, the stem portion 23 preferably has one or more apertures 25 therethrough for allowing bolt assemblies 27 to be used to bolt the stem portion 23, and thus the entire sweep 11, to a tine or a portion 29 of a conventional tool bar, etc., of an agricultural machine such as a tractor as will now be apparent to those skilled in the art and as shown in FIG. 5. The stem portion 23 has a front 30 that dirt and the like will impinge against as the sweep 11 is pulled across the ground, etc., as will now be apparent to those skilled in the art.

The main body portion 13, including the ground engaging portion 15 and the stem portion 23, may be manufactured in various specific manners and in various specific sizes and designs as will now be apparent to those skilled in the art. Thus, the body portion 13, including the ground engaging portion 15 and the stem portion 23, may be formed as an integral, one-piece unit out of standard high-carbon steel by, for example, being pressed from a single blank of standard high-carbon steel, etc., as will now be apparent to those skilled in the art.

The sweep 11 includes an extended wear portion or means 31 applied to at least the front 30 of the stem portion 23 (see FIGS. 5 and 7) for rendering the stem portion 23 highly resistant to abrasion. The extended wear means 31 may consist of welding a highly abrasion and wear resistant metal to the stem portion 23 by a conventional hardfacing process. However, the extended wear means 31 is preferably applied by pouring an alloy compound slurry onto the stem portion 23, or dipping the stem portion 23 into the alloy compound slurry; then drying the assembly (i.e., the sweep 11 with the applied compound slurry) until all moisture is removed; then fusing the applied alloy compound in a high heat furnace under optimal atmospheric conditions for a short period of time; and then allowing the assembly (i.e., the sweep 11 with the applied alloy compound) to slow cool. The assembly can the be heat-treated to a conventional manner to harden the base metal. Such a process is well know to those skilled in the art and commonly referred to as the "Dura-Face" process. While the present invention is believed to encompass an extended wear means 31 applied by either the "Dura-Face" process or a convention hard-facing process, the "Dura-Face" process is preferred in the present invention. Under the convention hard-facing process, very high localized heat is applied to the part being treated. This type of heat is conducive to causing microscopic fractures to develop in the base metal. While this may be allowable along the cutting edge 17, it is not acceptable in a stress area such as the stem portion 23 which is subjected to great amounts of force. Even if the entire part were heat-treated after the hard-facing process, this would not cause the heat fractures caused by the localized heating to disappear. In the "Dura-Face" process, the entire part is raised to the same temperature, thereby normalizing the metal and avoiding any such heat fractures. For a detailed description of the "Dura-Face" process and composition, see Alessi, U.S. Pat. Re. 27,851, reissued Dec. 25, 1973, incorporated herein by reference.

The sweep 11 may also include an extended wear portion or means 33 applied to the cutting edge 17 of the ground engaging portion 15 of the main body portion 13 (see FIGS. 5, 6 and 7) for rendering the cutting edge 17 highly resistant to abrasion. The extended wear means 33 may be constructed and applied to the sweep 11 using a process substantially identical to the process disclosed hereinabove relative to the extended wear means 31.

As thus constructed, the present invention provides an agricultural sweep with a wear coated stem to enhance the useful life of the sweep.

Although the present invention has been described and illustrated with respect to preferred embodiments and preferred uses therefor, it is not to be so limited since modifications and changes can be made therein which are within the full intended scope of the invention.

I claim:

1. An agricultural sweep for being attached to a tractor for pulling said agricultural sweep across the ground, said agricultural sweep comprising:

(a) ground engaging means having a cutting edge for cutting through the ground as said sweep is pulled across the ground;

(b) stem means for attaching said ground engaging means to a tractor, said stem means having a front; and (c) surface conforming wear resistant coating surface attached at least to said front of said stem means for rendering said stem means resistant to abrasion.

2. The agricultural sweep of claim 1 in which said surface conforming wear resistant coating surface is composed of an alloy compound.

* * * * *